US012794783B1

(12) United States Patent
Kumar et al.

(10) Patent No.: US 12,794,783 B1
(45) Date of Patent: Nov. 10, 2026

(54) METHOD AND SYSTEM FOR PREDICTING NETWORK TRAFFIC VIA HYPER TARGETED MODEL ADAPTATION

(71) Applicant: Verizon Patent and Licensing Inc., Basking Ridge, NJ (US)

(72) Inventors: Durgesh Kumar, Bangalore (IN); Subham Biswas, Thane (IN); Saurabh Tahiliani, Noida (IN); Tushar Singh, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 19/214,823

(22) Filed: May 21, 2025

(51) Int. Cl.
*G06F 15/16* (2006.01)
*H04L 41/147* (2022.01)
*H04L 41/16* (2022.01)

(52) U.S. Cl.
CPC ............ *H04L 41/147* (2013.01); *H04L 41/16* (2013.01)

(58) Field of Classification Search
CPC .............................. H04L 41/147; H04L 41/16
See application file for complete search history.

(56) References Cited

U.S. PATENT DOCUMENTS

2020/0112489 A1* 4/2020 Scherger ............. G06F 11/2028
2020/0252300 A1* 8/2020 Levy-Abegnoli ............................ H04L 41/0813
2020/0372322 A1* 11/2020 Wang ........................ G06N 3/09
2023/0216762 A1* 7/2023 Shamdani ........... H04L 43/0811 709/224
2023/0394960 A1* 12/2023 Symes .................... G01W 1/10

* cited by examiner

*Primary Examiner* — Razu A Miah

(57) ABSTRACT

The present teaching relates to network traffic prediction. A discrepancy between a model-predicted and actual network traffic is determined. A model adaption is initiated if the discrepancy meets some condition. Drifting features in network operation data and impacted parts of the prediction model are determined. Weights associated with the impacted parts in the prediction model are adjusted. The adjusted weights are used to update the prediction model if a loss associated therewith is decreasing. The adaptation process continues until convergence. The adapted prediction model is used to predict future network traffic, which is used to manage the network operation.

17 Claims, 13 Drawing Sheets

100

100

200

210

500

METHOD AND SYSTEM FOR PREDICTING NETWORK TRAFFIC VIA HYPER TARGETED MODEL ADAPTATION

BACKGROUND

In network management, different aspects of the network performance may be predicted to facilitate preemptive management of the network. For example, a network operator may desire to balance the traffic across various regional area networks (RANs) to achieve the overall performance of the entire network. The traffic pattern of these RANs may be modeled so that the upcoming traffic volume may be predicted using the model. As another example, the health of different network components may be modeled to predict the health of the network components so that upgrades/maintenance may be preemptively scheduled to prevent failures/problems.

BRIEF DESCRIPTION OF THE DRAWINGS

The methods, systems and or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION OF EXAMPLE EMBODIMENTS

Figure 1A:
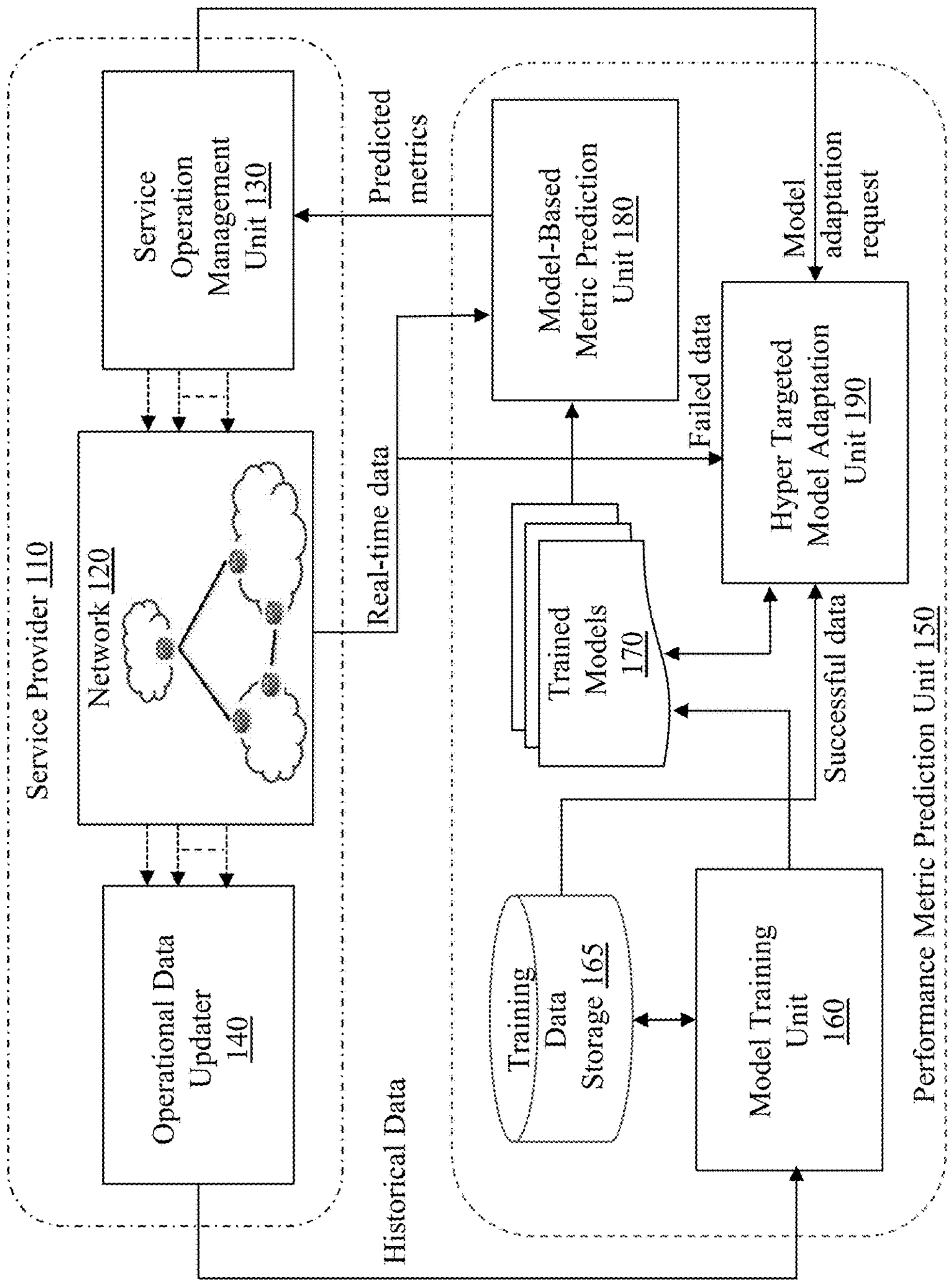
FIG. 1A depicts an exemplary system for network management using metrics predicted based on real-time network operational data via hyper targeted adapted models, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

Digital data representing operational states of network elements/services/products is often used to train models to learn the causal relations between different measures and the operational states of the network elements/services/products. The relations captured by the trained models may be leveraged to make predictions on, e.g., the network performance, given the data collected from the operation. However, such causal relations frequently change over time. When that happens, the previously trained models may fail to produce accurate or reasonable predictions that meet the reality. Traditional solutions address this via a generic approach by, e.g., re-training the models using all data which can be time consuming without any insight as to the cause for the failure of the models.

The present teaching discloses an enhanced solution to adapt network prediction mechanisms relying a previously trained model by using a hyper targeted approach. If a model trained successfully on some training data to predict certain network performance related metrics (e.g., the upcoming network traffic), when the model fails to produce predictions consistent with the reality (e.g., the actual network traffic), it may signal that the trained model no longer embeds the appropriate knowledge (e.g., characteristics of the current network operation patterns) consistent with the failed data, and "drift" has occurred. That is, the failed model performance may be due to changed data patterns. The hyper targeted approach according to the present teaching aims to improve network predictions by fine tuning parts of a model that are impacted by any data drifting behavior. For example, an input vector may include multiple features, some of which may have drifted when compared with the same features in previous training data used to train the model. An exemplary approach to detecting drifting feature may be based on the distribution of the feature. If the distribution in the historical network operation data differs from that in the current network operation data, the feature no longer exhibits the same behavior, i.e., it has drifted. In other embodiments, the drifting may be detected based on, e.g., the statistics computed from the distributions in historical and current network operation data.

Based on the detected drifting features, nodes and layers that link to the drifting features (either as input or propagated therefrom) are identified as imparted parts of the model. The weights associated with such links are targeted for fine tuning. The adjustments made on such weights are targeted at the drifting features. Comparing with the traditional approach to re-train all weights on all links in an ANN model, the present teaching is highly targeted to focus on only impacted parts of the model.

In addition to the targeted approach, the model adaptation scheme according to the present teaching also includes the aspect of further optimizing the fine tuning of the targeted weights by identifying nodes/layers that behave similarly in terms of loss impact so that a smaller set of the targeted weights are actually fine-tuned. Then the converged weights on this smaller set of targeted weights may be propagated to the links associated with other similarly behaving nodes/layers. This further reduces the computation expenses associated with adaptation so that the fine tuning may be performed more frequent to allow the models to track the changes of the input data.

FIG. 1A depicts an exemplary system 100 for network management using metrics predicted based on real-time network operational data via prediction models that adapt with data using hyper targeted approach, in accordance with an embodiment of the present teaching. In this illustration, the system 100 includes a service provider 110 and a performance metric prediction unit 150. As shown, the service provider 110 includes a network 120, through which networked services are delivered to customers, a service operation management unit 130 for managing different aspects of the network operations to ensure performance, and an operational data updater 140 for providing continuous historical data for adaptive data modeling to the performance metric prediction unit 150.

The performance metric prediction unit 150 includes a model training unit 160, a model-based metric prediction unit 180, and a hyper targeted model adaptation unit 190. The historical data is provided to the model training unit 160 that accordingly creates training data in storage 165 and obtains, via machine learning, trained models 170. Via machine learning, the trained models 170 capture the knowledge embedded in the training data. That is, the training data is successful because it facilitates the trained models 170 to learn the insights from the data. With the trained models 170, the model-based metric prediction unit 180 predicts, based on real time data from the operation of the network, performance related metrics. Such predicted performance related metrics may then be used by the service operation management unit 130 to accordingly manage the network to optimize the performance. For instance, the predicted network traffic related to different network elements may be used to balance the load across different network elements or to allocate resources needed preemptively to such network elements. As another example, the predicted network traffic may be used for RAN planning. Alternatively, the prediction may be directed to potential network intrusion based on modeled network patterns so that such predicted network intrusions may be used to identify malicious activities based on network KPIs and packet activities that may be indicative of anomalies. Such predictions may also be customer related such as bandwidth needs, usage changes, churn likelihood, etc.

Data patterns may change over time. When that happens, the trained models 170 were trained using previously collected historical data and may produce predicted metrics that do not conform to the actual metrics, but rather the previous historical data. When this discrepancy exceeds a certain level (which may be specified as some triggering condition), it may cause issues as the performance related metrics predicted using the trained models 170 may no longer be able to provide valuable insights to the service operation management unit 130 to manage the network operation. When the discrepancy is detected between the predicted and the actual metrics, this may indicate that the trained models 170 have not captured the knowledge embedded in the current network data and, hence, need to be adapted to the data. In this case, the service operation management unit 130 may send a model adaptation request to the hyper targeted model adaptation unit 190 to activate the hyper targeted model adaptation process. As discussed herein, the hyper targeted approach according to the present teaching may detect drifting features by comparing the successful data (used to train the original models 170) as well as the failed data on which the trained models 170 failed to produce correct or accurate predictions.

Figure 1B:
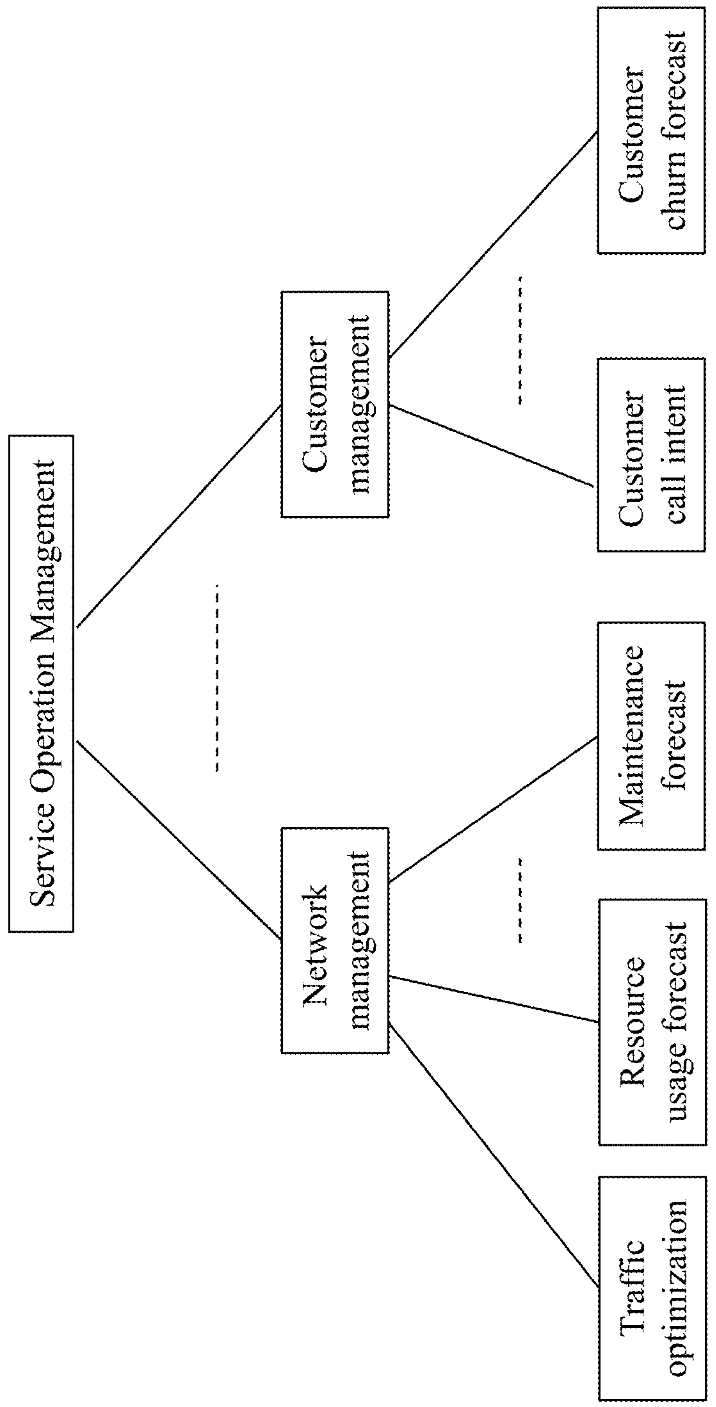
FIG. 1B illustrates exemplary aspects of network operations to be managed based on metrics predicted using hyper targeted adapted models, in accordance with an embodiment of the present teaching.

FIG. 1B illustrates exemplary aspects of network operation management tasks that may be managed based on metrics predicted prediction models adapted using the hyper targeted approach, in accordance with an embodiment of the present teaching. For example, the service provider 110 may desire to manage the network according to the predicted performance metrics. For example, to manage the traffic to network elements, the predicted traffic volume may be utilized to determine how to direct traffic to multiple network elements to achieve load balance to ensure smooth network operation. Another example is network resource management. Predicted metrics on resource needs with respect to different network elements may be used to dynamically allocate network resources to network elements. Yet another example may be related to managing network maintenance based on predicted potential failures on certain network elements so that preemptive maintenance may be scheduled to prevent the predicted failure. The predicted metrics may also include an estimated intent associated with a customer's call so that an appropriate agent at the service operation management unit 130 may be assigned to handle the call. Predicted probabilities of churning of different customers may also be predicted so that preemptive measures may be adopted to avoid the customers' churn.

Figure 1C:
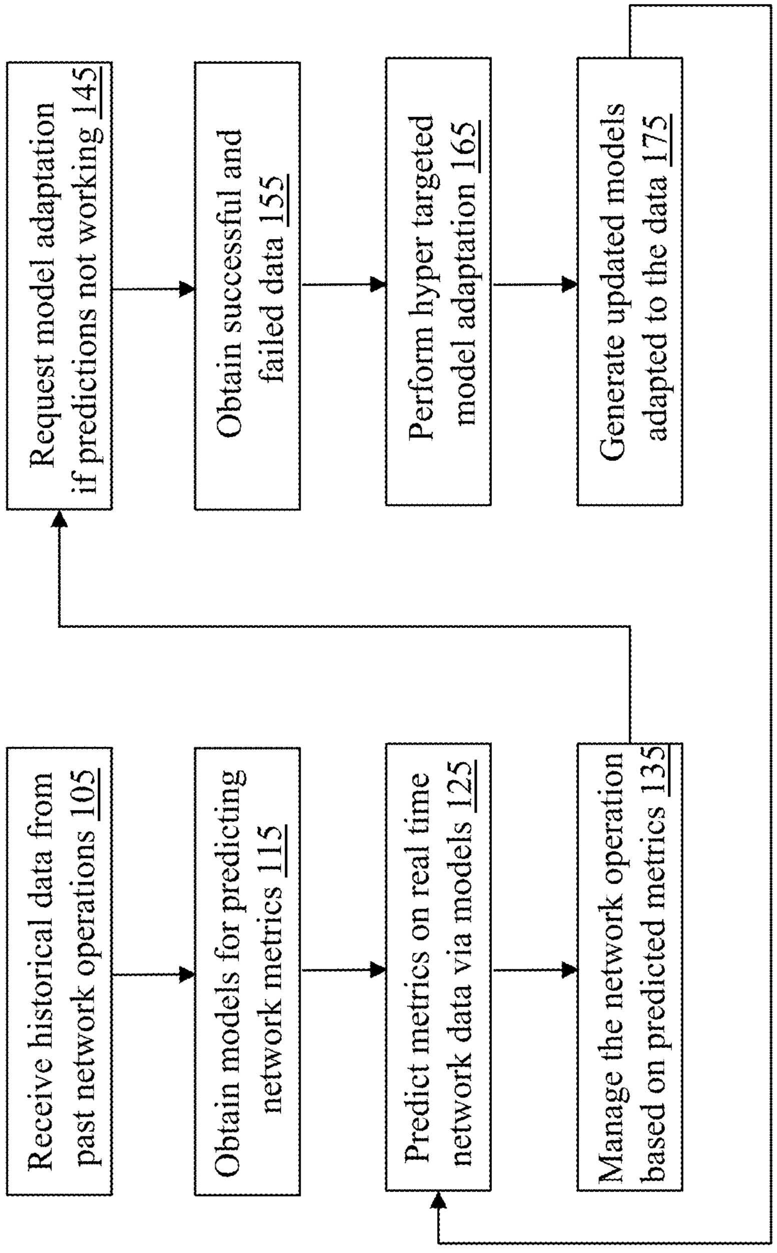
FIG. 1C is a flowchart of an exemplary process for network management using metrics predicted based on real-time network operational data via hyper targeted adapted models, in accordance with an embodiment of the present teaching.

FIG. 1C is a flowchart of an exemplary process for network management using metrics predicted based on real-time network operational data via hyper targeted adapted models, in accordance with an embodiment of the present teaching. When historical data collected from past network operations is received at 105, it is used to obtain, at 115, models for predicting various network metrics. In network operation, when real time data from the network is received, the trained models may then be to predict, at 125, different metrics and sent to the service operation management unit 130, which may manage, at 135, different aspects of the network operation according to the predicted metrics. Whenever it is detected that the predicted metrics are inconsistent with subsequently observed network performance, the service operation management unit 130 sends a model adaptation request, at 145, to the hyper targeted model adaptation unit 190. To adapt the trained models 170, the relevant data (successful and failed data) is obtained at 155 and used to identify drifting features to perform hyper targeted model adaptation, at 165, to generate updated models that adapt to the data so that when additional real time data is received from the network, the adapted trained models 170 may be used to predict metrics.

Figure 2A:
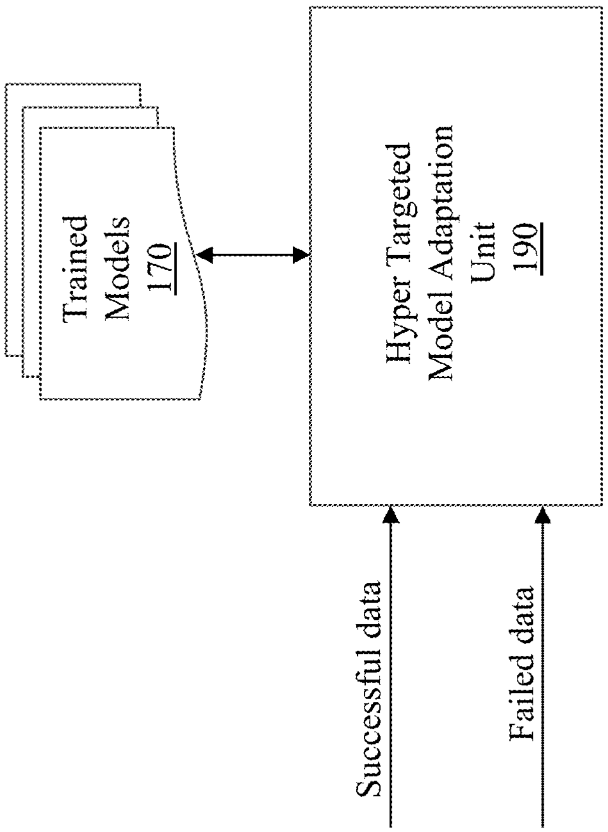
FIG. 2A depicts an exemplary hyper targeted model adaptation unit for adapting trained models based on drifting features identified from data, in accordance with an embodiment of the present teaching.
Figure 2B:
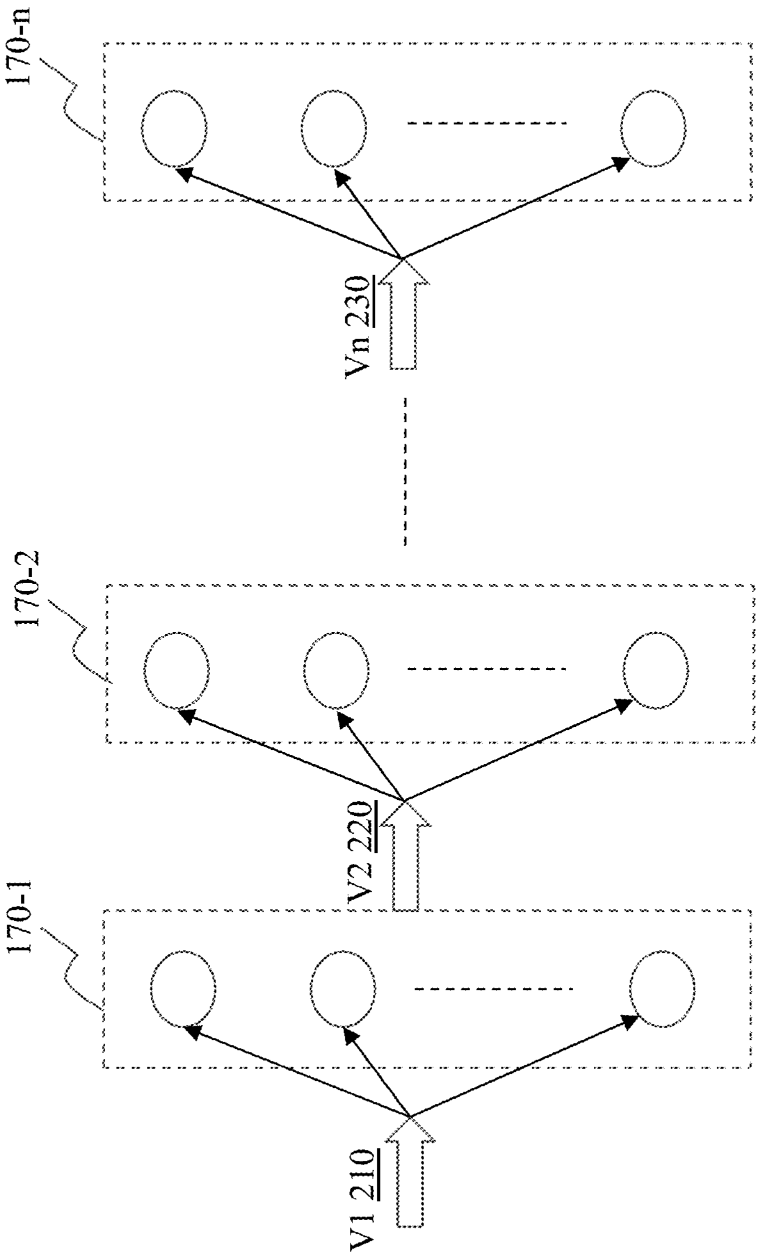
FIG. 2B illustrates an exemplary construct of an artificial neural network (ANN) with multiple layers, each of which including multiple nodes, connected via vectors.

FIG. 2A depicts the high-level depiction of the hyper targeted model adaptation unit 190 for adapting trained models 170 using hyper targeted approach, in accordance with an embodiment of the present teaching. As discussed herein, the hyper targeted approach of the present teaching targets the fine tuning of trained models 170 on weights associated with links to nodes/layers impacted by drifting features. In the illustrated embodiment, the data drifting is identified by comparing the successful and failed data to detect the data behavior change. Based on such identified data drift, the hyper targeted model adaptation unit 190 then adjusts the trained models 170 by targeting at the parts thereof that are impacted by the drifting data. Depending on the models, the impacted parts may be identified accordingly. For example, if the trained models 170 correspond to ANN models, the parts of the models that are impacted by drifting data may be identified as nodes/layers. FIG. 2B illustrates an exemplary construct of an ANN model 170 with n layers 170-1, 170-2, . . . , **170-*n*, each of which having a plurality of nodes. The input layer 170-1 takes a feature vector V1 210 as input and the different layers are connected also via intermediately computed vectors such as V2 220, . . . , Vn 230**.

Figure 2C:
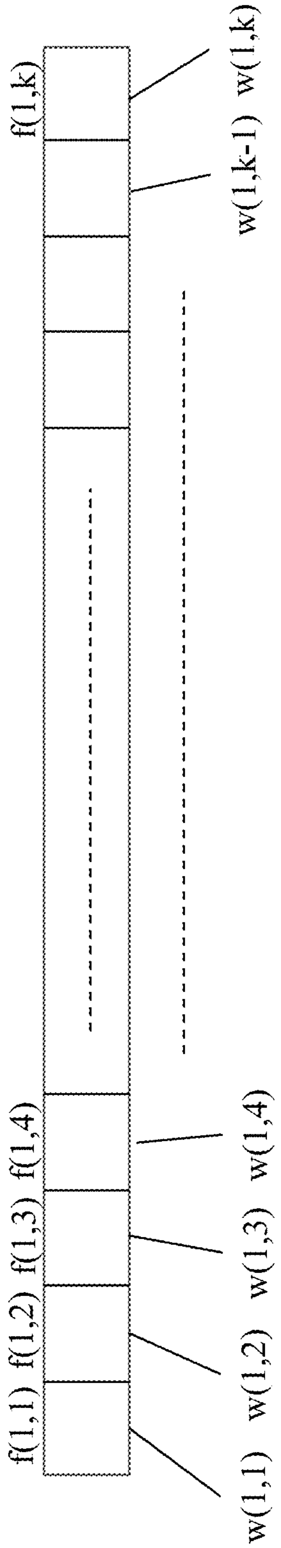
FIG. 2C illustrates an exemplary construct of a vector in an ANN with multiple features, each of which is associated with a weight determined in machine learning.

FIG. 2C illustrates an exemplary construct of a feature vector V1 210 in an ANN model with k features, where f (i, j) representing a feature linked to a node j at layer i. In this specific example, the feature vector 210 corresponds to an input vector with features f (1,1)-f (1, k). Each feature in feature vector 210 is associated with a weight w (1, j) used to provide a weighed feature value w (1, j)×f (1, j), 1<=j<=k, to an input node at the input layer. Similarly, any feature vector provided to any node at any layer in the ANN model 170 is weighed using a set of weights. Such weights are derived during in machine learning of the trained models 170 in an iterative process until the models converge. The process of iteratively adjusting the weights to minimize the overall loss is the process of learning so that the final weights across an entire ANN model embed the knowledge captured during training (together with the functions associated with the nodes at all layers). A traditional solution to adapting a trained ANN model is to re-adjust all the weights associated with all features of all vectors communicated between and among all nodes/layers of the model.

The hyper targeted model adaptation scheme according to the present teaching is to selectively fine tuning only some of the weights associated with the drifting features of the data. For example, although there are k features in the input vector 210 in FIG. 2C, there may be only a few features therein that exhibit drifting behavior. When vector 210 is provided to different nodes at the input layer 170-1, only the nodes in the input layer 170-1 that take the drifting features as input are impacted by the drifting data. Such impacted nodes at the input layer 170-1 may generate output which is then sent to other nodes, etc. In this way, the connections between nodes and layers with weights thereon that are impacted by the drifting features may be identified through propagation. The weights on such identified connections may then need to adapted or re-adjusted to adapt the trained models 170 to the failed data.

Figure 3A:
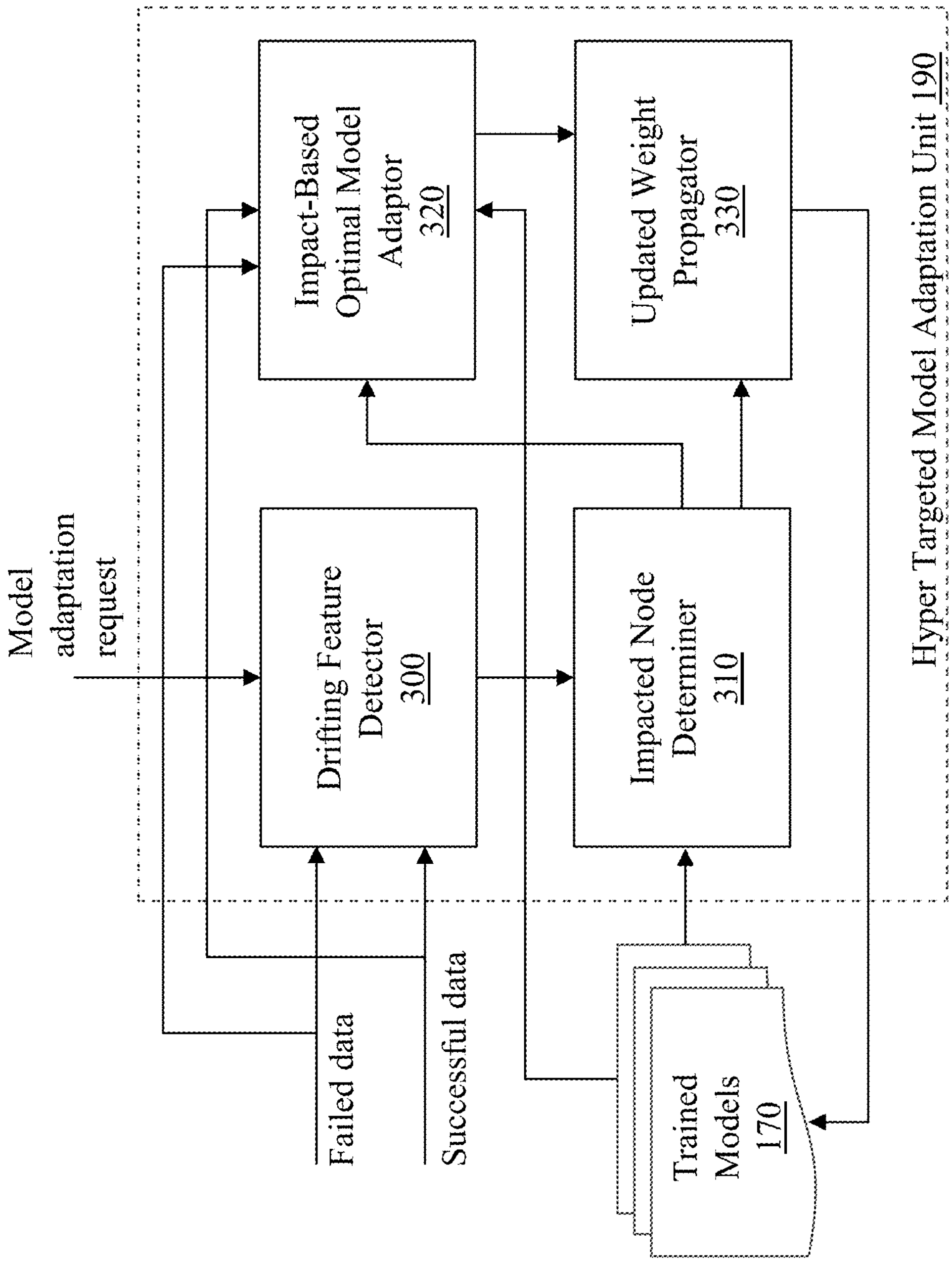
FIG. 3A depicts an exemplary high-level system diagram of a hyper targeted model adaptation unit, in accordance with an embodiment of the present teaching.

FIG. 3A depicts an exemplary high-level system diagram of the hyper targeted model adaptation unit 190, in accordance with an embodiment of the present teaching. In this illustrated embodiment, the hyper targeted model adaptation unit 190 comprises a drifting feature detector 300, an impacted node determiner 310, an impact-based optimal model adaptor 320, and an updated weight propagator 330. The drifting feature detector 300 is provided to identify (e.g., when triggered by a model adaptation request received from the service operation management unit 130) drifting features based on patterns exhibited in the successful data and the failed data. The impacted node determiner 310 is provided to identify the nodes in the trained models 170 that are impacted by the drifting featured so that the fine-tuning of weights may be limited to those nodes that are deemed impacted by the drifting features.

As discussed herein, in addition to limit fine tune of only weights relating to impacted nodes/layers, the number of weights to be fine-tuned may be further reduced. This may be achieved by identifying those impacted nodes that are impacted in similar ways. In some embodiments, whether two nodes are impacted by drifting features similarly may be determined by assessing how weight adjustments influence different impacted nodes. The influence may be assessed to see how changes to weights change an impact loss associated with each node. For example, a change made to weights in an iteration may lead to a change in loss, with either an increase or a decrease, representing respectively a negative impact loss or a positive impact loss.

If the impact losses for two nodes react the same or similar way to weight adjustments, these two nodes are similar with respect to impact loss. If the impact losses for a group of nodes are highly similar, these nodes may be deemed as similarly impacted by the drifting features. In this case, for each group of similar nodes, weight fine-tuning may be performed with respect to only a representative one of the similar nodes to minimize the computation time needed for adaptation. The weights associated with representative node from each group of similar nodes may be fine-tuned in an iterative process which converges when the overall loss of the model is minimized or reaches an equilibrium. Upon convergence, the weights adjusted with respect to the representative nodes from corresponding similar groups may be propagated to other similar nodes in each similar group.

With this scheme, the adaptation process is further optimized. In the exemplary embodiment as shown in FIG. 3A, the impacted-based optimal model adaptor 320 is provided to adapt the trained models 170 with respect to those impacted nodes in an optimized manner as discussed herein. Details about the impacted-based optimal model adaptor 320 are provided with reference to FIGS. 4A-4C. Once the optimized weight fine-tuning process converges, the fine-tuned weights are to be propagated to other similarly impacted nodes. This is performed by the updated weight propagator 330.

Figure 3B:
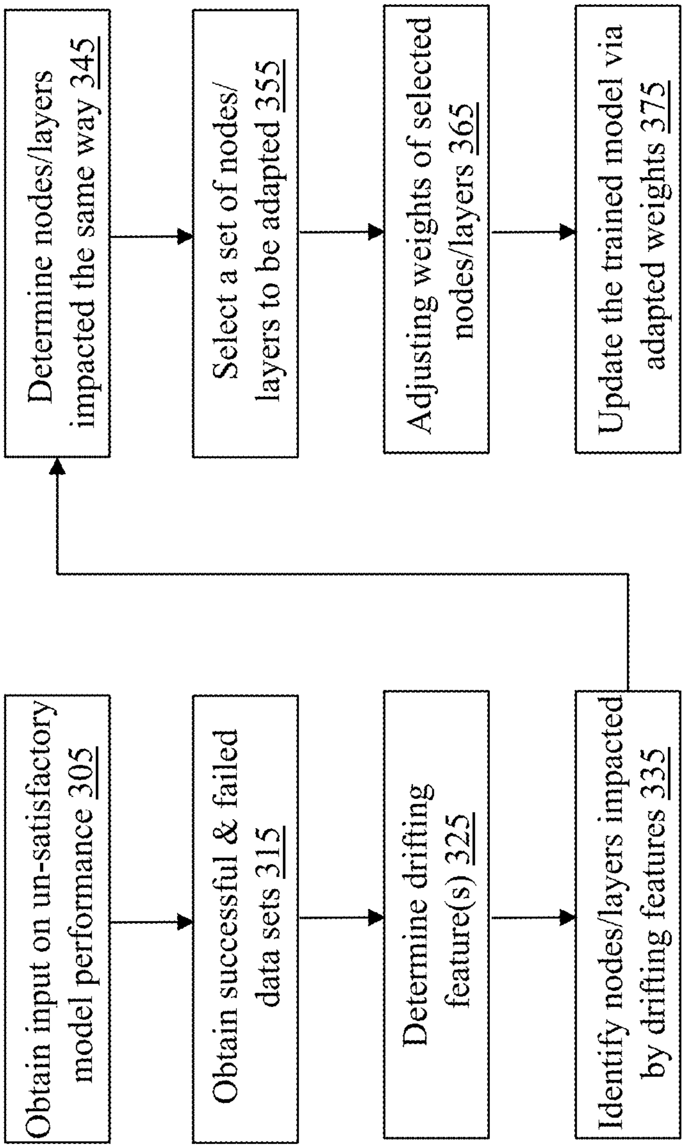
FIG. 3B is a flowchart of an exemplary process for a hyper targeted model adaptation unit, in accordance with an embodiment of the present teaching.

FIG. 3B is a flowchart of an exemplary process of the hyper targeted model adaptation unit 190, in accordance with an embodiment of the present teaching. When the service operation management unit 130 detects unsatisfactory predictions made using the trained models 170, it sends a model adaptation request to the hyper targeted model adaptation unit 190. Upon receiving, at 305, an indication (the model adaptation request) of unsatisfactory model performance, the drifting feature detector 300 obtains, at 315, the successful and failed data sets to determine, at 325, drifting features. Based on the identified drifting features, the impacted node determiner 310 identifies, at 335, the nodes/layers in the trained models 170 that are impacted by the drifting features. With the identified impacted nodes, the impact-based optimal model adaptor 320 determines, at 345, nodes/layers that are similarly impacted so that a set of representative nodes/layers from the similarly impacted groups may be selected at 355. The weights associated with the selected nodes/layers for fine-tuning are adjusted, at 365, in an iterative process until convergence. Once the weights to be fine-tuned converge, the updated weight propagator 330 proceeds to update, at 375, the weights of other similarly impacted nodes/layers by propagating the adjusted weights thereto.

Figure 4A:
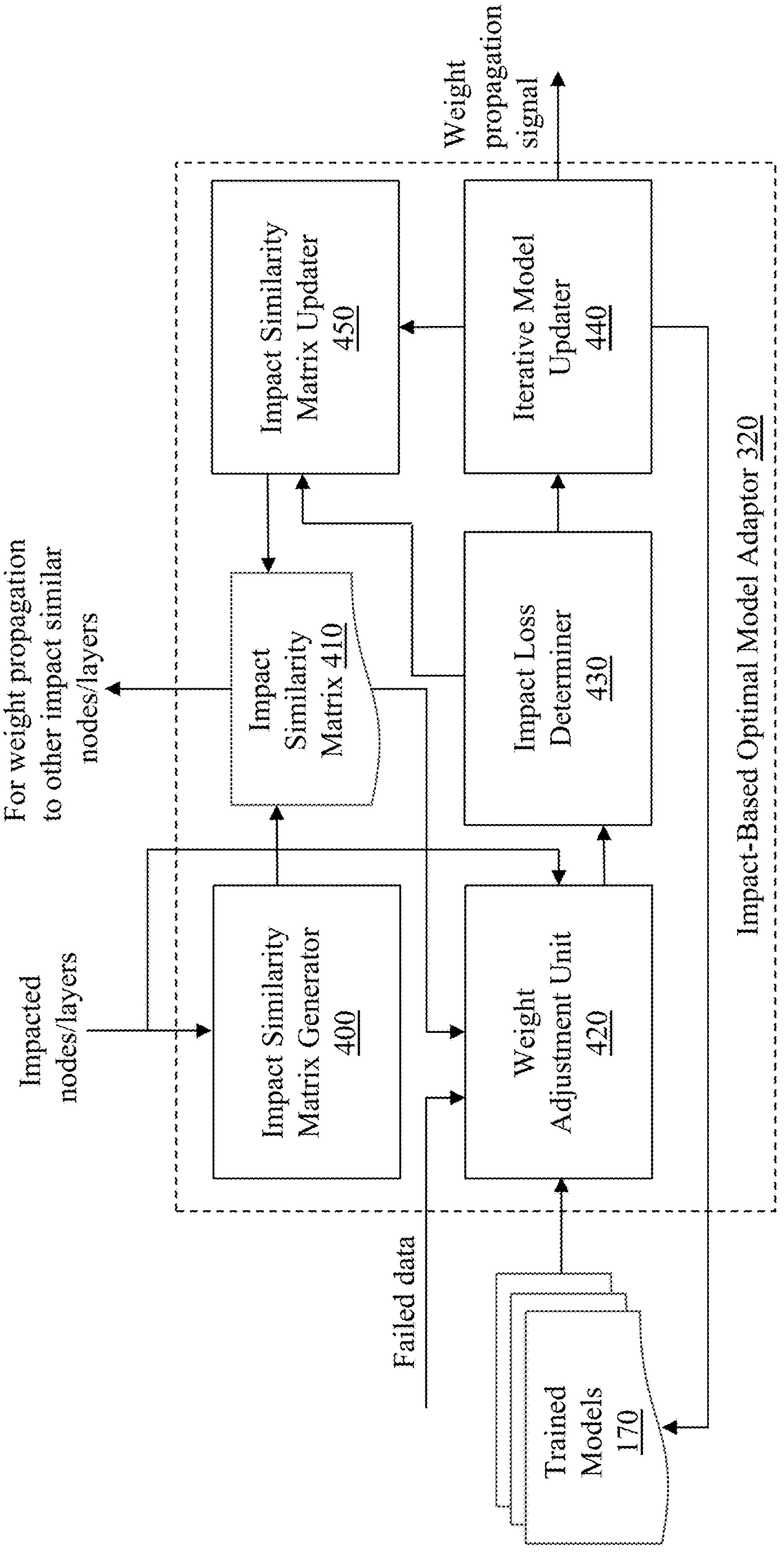
FIG. 4A depicts an exemplary high-level system diagram of an impact-based optimal model adaptor, in accordance with an embodiment of the present teaching.

FIG. 4A depicts an exemplary high-level system diagram of the impact-based optimal model adaptor 320, in accordance with an embodiment of the present teaching. In this illustrated embodiment, the impact-based optimal model adaptor 320 comprises an impact similarity matrix generator 400, a weight adjustment unit 420, an impact loss determiner 430, an iterative model updater 440, and an impact similarity matrix updater 450. The impact similarity matrix generator 400 and the impact similarity matrix updater 450 are provided for maintaining an impact similarity matrix 410 which records the information on which impacted nodes/layers are similarly impacted to facilitate the optimized adaptation process. The weight adjustment unit 420, the impact loss determiner 430, and the iterative model updater 440 form a loop to carry out the iterative adaptation process. Based on the impacted nodes/layers (by the impacted node determiner 320 in FIG. 3A), the impact similarity matrix generator 400 is provided to create the impact similarity matrix 410. In some implementation, the similarity matrix 410 may be a matrix with rows and columns corresponding to the same impacted nodes/layers.

Figure 4B:
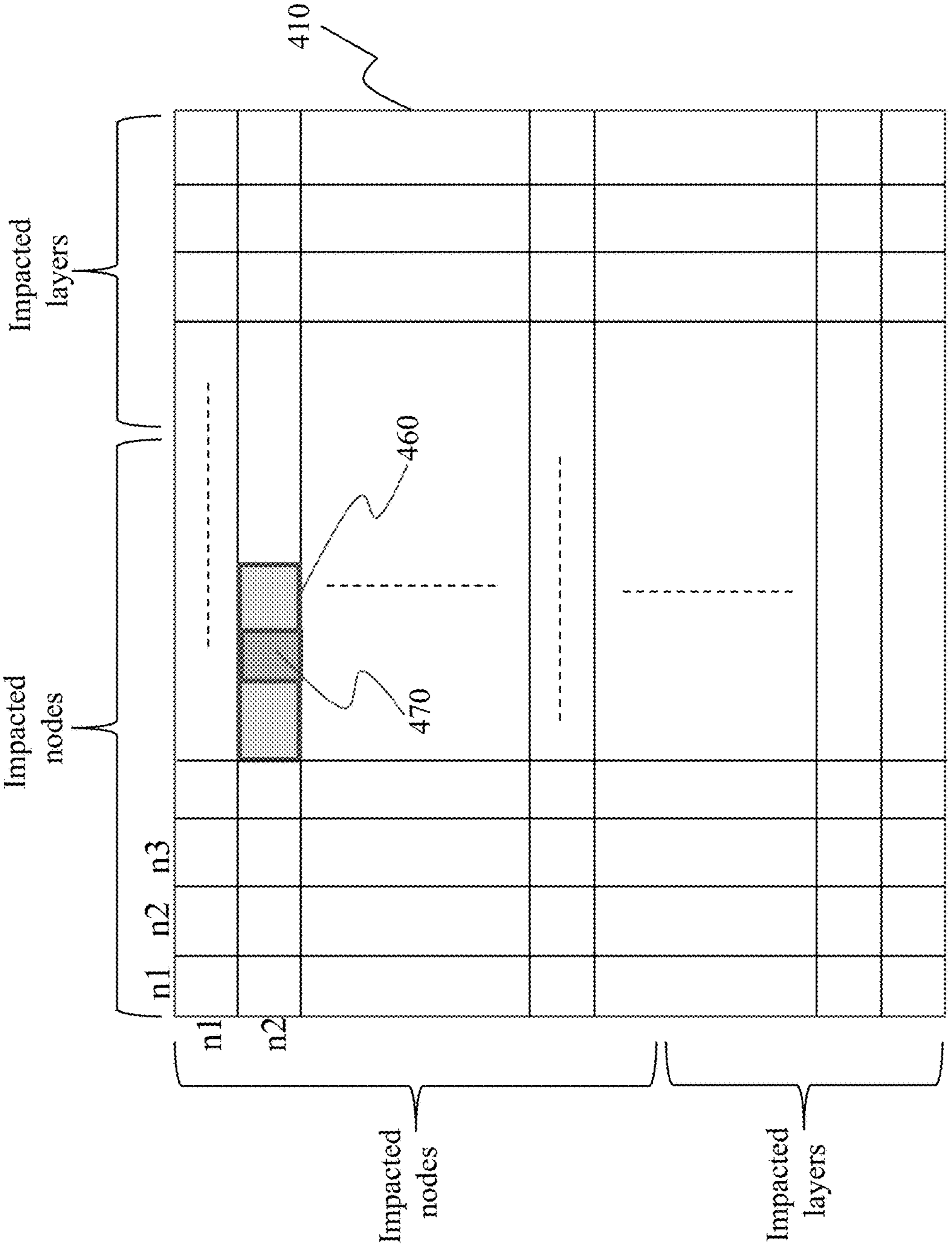
FIG. 4B shows an exemplary construct of a similarity matrix for optimizing a model adaptation process, in accordance with an embodiment of the present teaching.

FIG. 4B shows an exemplary similarity matrix 410 for optimizing a model adaptation process, in accordance with an embodiment of the present teaching. In this example, the matrix has rows, representing impacted nodes and layers, and columns, representing the same impacted nodes/layers. Each cell in matrix 410 may record information that may be used to facilitate the optimization of the adaptation process. For example, a cell corresponding to, e.g., row i and column j, may record a similarity metric indicative of how node i and node j are similarly influenced based on impact loss, or whether the node corresponding to the row (or column) is a representative node of a group of similarly impacted nodes. For example, in the illustrated matrix 410, the nodes in group 460 are those that are similarly influenced by impact loss nodes and one of them 470 is marked as a representative node in group 460 selected for weight fine-tuning. Such information may be used to dynamically control an optimized weight adjustment process. In addition to that, when the adaptation process converges, the impact similarity matrix 410 may further be used to facilitate the propagation process. Using the illustrated example in FIG. 4B, upon convergence, information recorded in the impact similarity matrix 410 may be used for the propagation process. For example, if weights associated with the representative node 470 are fine-tuned to reach convergence, the impact similarity matrix 410 may be output to the updated weight propagator 330 (FIG. 3A) so that the other nodes in the same similar group 460 may be identified to propagate the updated weights derived for node 470 to other nodes in the same group.

The impact similarity matrix generator 400 takes the identified impacted nodes/layers as input and accordingly create an initial impact similarity matrix based on the input. The impact similarity matrix updater 450 is provided to update the impact similarities in each iteration between nodes/layers based on the impact losses (computed by the impact loss determiner 430) with respect to different nodes/layers during the process of fine-tuning.

As discussed herein, the iterative fine-tuning process is carried out by the weight adjustment unit 420, the impact loss determiner 430, and the iterative model updater 440. In each iteration, the weight adjustment unit 420 may adjust the weights associated with drifting features to impacted nodes by minimizing the loss on the failed data. The impact loss determiner 430 may compute the loss based on the adjusted weights. The impact of the weight adjustments before and after the adjustment may be computed that measures a change in loss due to the weight adjustment. To successfully adapt the trained models 170, the aim is to continually achieve a loss reduction (decrease) in each iteration. If the weight changes in an iteration leads to a decrease in the loss, the iterative model updater 440 is provided to update the trained models 170 by changing the weights therein according to the changes made in the current iteration. If the weight adjustment in an iteration does not lead to a decrease in loss, the changes made to weights in this iteration are not used to update the models.

The impact similarity matrix 410 is also updated in each iteration. An impact loss associated with each of the impacted nodes/layers may also be computed and the impact similarity matrix updater 450 may, in each iteration, use such impact losses to update the impact similarity between different impacted nodes/layers. For example, the impact losses from different iterations may be archived with respect to each of the impacted nodes/layers. An impact similarity measure between two different impacted nodes may be computed based on their respective impact losses in different iterations. In each iteration, when additional impact losses on nodes/layers are used to update the previously determined impact similarities. If the impact losses for some impacted nodes/layers exhibit the same influence from the drifting features, these nodes/layers may be marked as belonging to the similar impact loss group and may be represented as such in the impact similarity matrix 410. This is illustrated in FIG. 4B with a group of nodes 460. Although initially all impacted nodes/layers are subject to fine-tuning, during the adaption process, when some nodes/layers are grouped as similarly impacted, the impacted nodes/layers may accordingly be updated to have candidate fine-tuning nodes/layers and used by the iterative process. As discussed herein, in some embodiments, a representative node/layer from each impact similarity group may be selected for further weights fine-tuning. Such dynamically updated candidate representative nodes for weight fine-tuning may change during the course of the iteration based on the changing impact similarities.

Figure 4C:
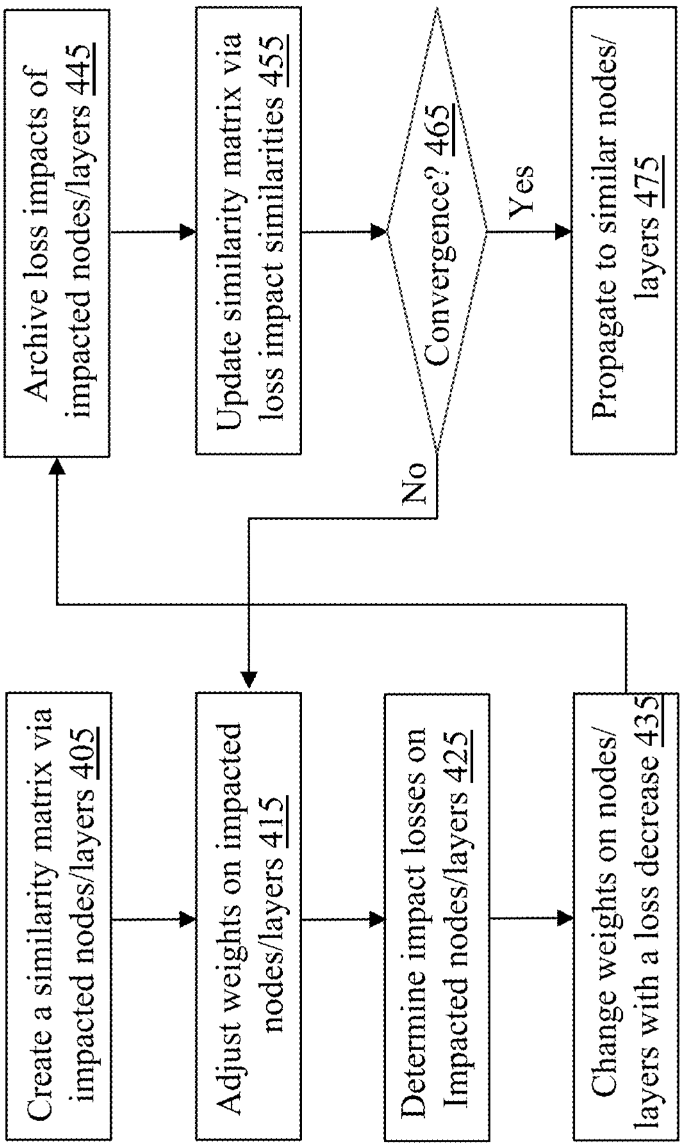
FIG. 4C is a flowchart of an exemplary process for an impact-based optimal model adaptor, in accordance with an embodiment of the present teaching.

FIG. 4C is a flowchart of an exemplary process for the impact-based optimal model adaptor 320, in accordance with an embodiment of the present teaching. In operation, when the impact similarity matrix generator 400 receives the impacted nodes/layers identified based on drifting features, it creates, at 405, the impact similarity matrix 410. Initially, the weights associated with all identified impacted nodes are subject to fine-tuning. The weight adjustment unit 410 adjusts, at 415, the weights associated with the impacted nodes by minimizing the loss of the trained models 170 on the failed data. Based on the adjusted weight values, the impact loss determiner 430 determines, at 425, the impact losses with respect to different nodes/layers. As discussed herein, such computed impact losses are used to determine whether the adjusted weights associated with each node in this iteration are to be used to change the weights in the trained models 170. When an impact loss associated with a node represents a loss decrease, the iterative model updater 440 implements the adjustment by changing, at 435, the weights of an associated node using the adjusted weight values.

The impact losses are also archived, at 445, with the impact similarity matrix updater 450 so that the impact similarities recorded in the impact similarity matrix 410 may be accordingly updated, at 455, and the candidate nodes/layers to be fine-tuned may also be updated based on the updated impact similarities. Such updated information may be fed back to the weight adjustment unit 420 so that in the next iteration, the weight fine-tuning is applied to the updated candidate nodes/layers that are associated with each impact similarity group. At the end of each iteration, the iterative model updater 440 determines, at 465, whether the current loss associated with the updated trained models 170 satisfies a predetermined convergence condition. If the convergence condition is met, the iterative model updater 440 sends a weight propagation signal to the updated weight propagator 330 to propagate the updated weights to other similarly impacted nodes at different layers. In some embodiments, the impact similarity matrix is output to the updated weight propagator 330 to facilitate the propagation. With this optimization scheme, the number of weights to be fine-tuned is kept minimum.

Figure 5:
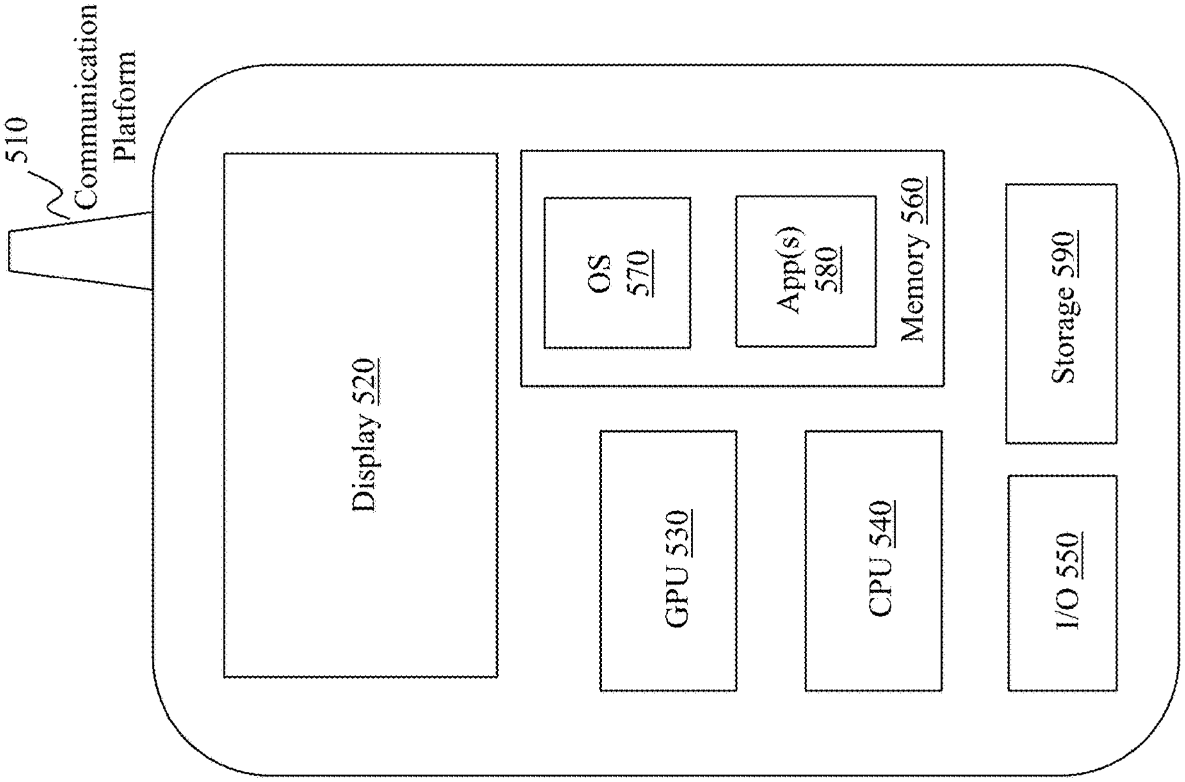
FIG. 5 is an illustrative diagram of an exemplary mobile device architecture that may be used to realize a specialized system implementing the present teaching in accordance with various embodiments.

FIG. 5 is an illustrative diagram of an exemplary mobile device architecture that may be used to realize a specialized system implementing the present teaching in accordance with various embodiments. In this example, the user device on which the present teaching may be implemented corresponds to a mobile device 500, including, but not limited to, a smart phone, a tablet, a music player, a handled gaming console, a global positioning system (GPS) receiver, and a wearable computing device, or a mobile computational unit in any other form factor. Mobile device 500 may include one or more central processing units ("CPUs") 540, one or more graphic processing units ("GPUs") 530, a display 520, a memory 560, a communication platform 510, such as a wireless communication module, storage 590, and one or more input/output (I/O) devices 550. Any other suitable component, including but not limited to a system bus or a controller (not shown), may also be included in the mobile device 500. As shown in FIG. 5, a mobile operating system 570 (e.g., iOS, Android, Windows Phone, etc.) and one or more applications 580 may be loaded into memory 560 from storage 590 to be executed by the CPU 540. The applications 580 may include a user interface or any other suitable mobile apps for information exchange, analytics, and management according to the present teaching on, at least partially, the mobile device 500. User interactions, if any, may be achieved via the I/O devices 550 and provided to the various components thereto.

To implement various modules, units, and their functionalities as described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 6:
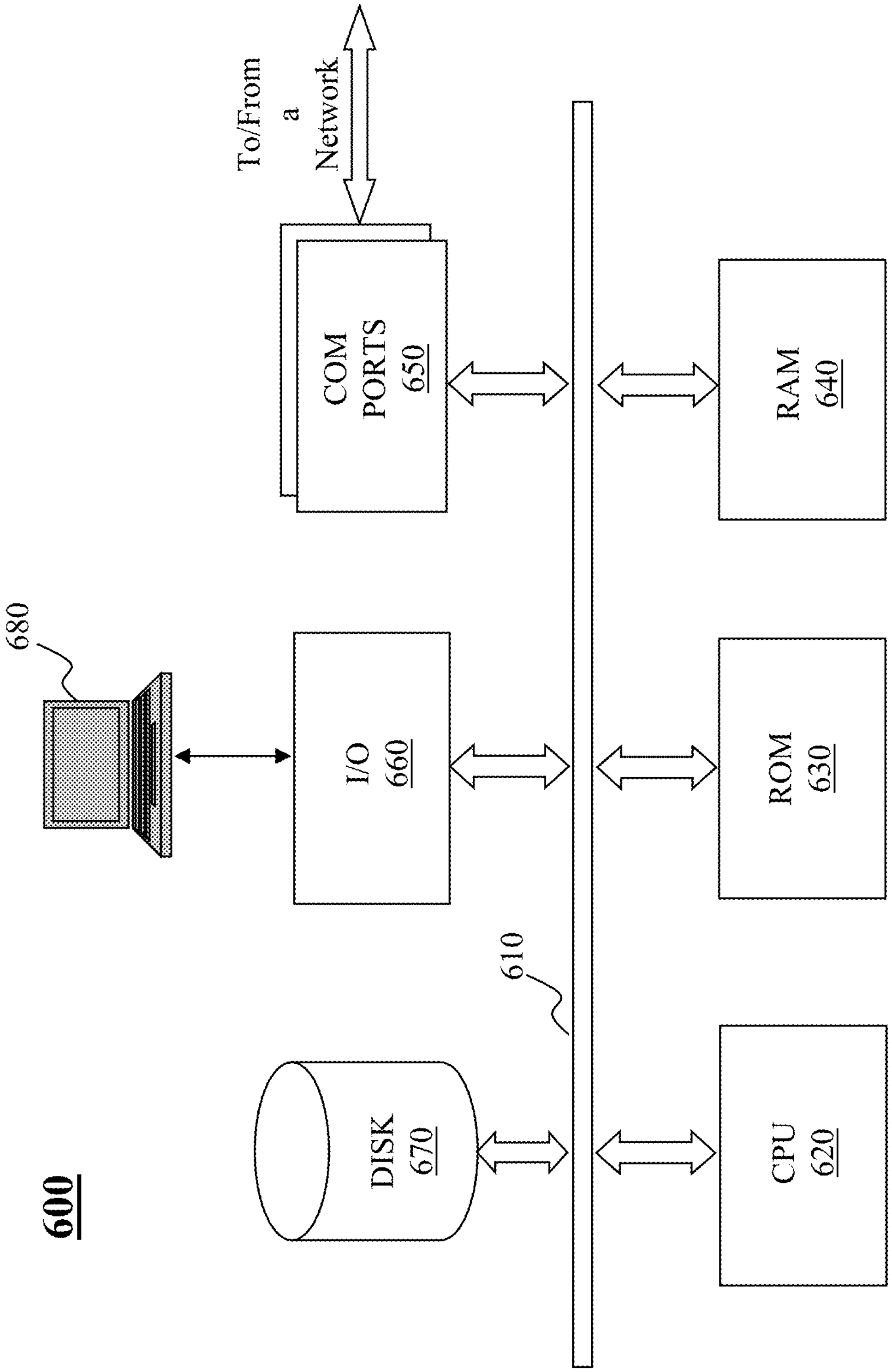
FIG. 6 is an illustrative diagram of an exemplary computing device architecture that may be used to realize a specialized system implementing the present teaching in accordance with various embodiments.

FIG. 6 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 600 may be used to implement any component or aspect of the framework as disclosed herein. For example, the information processing and analytical method and system as disclosed herein may be implemented on a computer such as computer 600, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 600, for example, includes COM ports 650 connected to and from a network connected thereto to facilitate data communications. Computer 600 also includes a central processing unit (CPU) 620, in the form of one or more processors, for executing program instructions. The exemplary computer platform includes an internal communication bus 610, program storage and data storage of different forms (e.g., disk 670, read only memory (ROM) 630, or random-access memory (RAM) 640), for various data files to be processed and/or communicated by computer 600, as well as possibly program instructions to be executed by CPU 620. Computer 600 also includes an I/O component 660, supporting input/output flows between the computer and other components therein such as user interface elements 680. Computer 600 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

It is noted that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

In the preceding specification, various example embodiments have been described with reference to the accompanying drawings. It will, however, be evident that various modifications and changes may be made thereto, and additional embodiments may be implemented, without departing from the broader scope of the present teaching as set forth in the claims that follow. The specification and drawings are accordingly to be regarded in an illustrative rather than restrictive sense.

We claim:

1. A method for predicting network traffic, comprising:

determining a discrepancy between predicted future network traffic and an actual level of network traffic, wherein the predicted future network traffic is estimated based on current network operation data using a model previously trained based on historical network operation data;

sending a model adaptation request to adapt the model to the current network operation data when the discrepancy satisfies a predetermined condition;

determining one or more drifting features in network operation data based on the historical network operation data and the current network operation data;

identifying multiple nodes/layers in the model that are impacted by the drifting features;

adapting the model by targeting at the impacted multiple nodes/layers by:

adjusting weights associated with each of the multiple nodes/layers along propagation paths of the drifting features, determining a current loss of the model using the adjusted weights, if the current loss corresponds to a loss decrease as compared with a previous loss of the model without the adjusted weights, updating the model using the adjusted weights, if the current loss corresponds to a loss increase as compared with the previous loss, replacing the previous loss using the current loss, and repeating the steps of adjusting, determining, updating, and replacing before the current loss satisfy a predetermined convergence condition;

predicting the future network traffic using the adapted model based on real time network data; and taking an action to manage the network according to the predicted future network traffic, wherein the action includes at least one of:

adjusting the network traffic directed to different regional area networks (RANs);

allocating resources to the RANs;

detecting network intrusions that cause the predicted network traffic.

2. The method of claim 1, wherein the determining one or more drifting features comprises:

with respect to each feature in an input vector to the model, determining a first distribution of the feature based on the historical network operation data, determining a second distribution of the feature based on the current network operation data, selecting the feature as a drifting feature if the second distribution differs from the first distribution.

3. The method of claim 2, further comprising:

computing a first set of statistics characterizing the first distribution;

computing a second set of statistics characterizing the second distribution;

determining whether the second distribution differs from the first distribution based on the first and the second set of statistics.

4. The method of claim 1, wherein the identifying multiple nodes/layers comprises:

identifying impacted nodes in an input layer of the model that take a drifting feature as input;

for each of the impacted nodes in the input layer, identifying a propagation path from the impacted node to nodes at other layers in the model, identifying propagated nodes in the propagation path in the other layers;

determining the impacted layers each of which includes at least one impacted or propagated nodes; and outputting the impacted nodes in the input layer, the propagated nodes in the other layers, and the impacted layers as the multiple nodes/layers.

5. The method of claim 1, further comprising updating, in each iteration, an impact similarity matrix recording impact similarities between the multiple nodes/layers by:

receiving impact losses computed for the multiple nodes/layers due to the adjusted weights;

computing the impact similarities between different ones of the multiple nodes/layers based on the received impact losses;

recording the impact similarities in the impact similarity matrix.

6. The method of claim 5, further comprising updating the multiple nodes/layers based on the impact similarities between different ones of the multiple nodes/layers.

7. A machine-readable and non-transitory medium having information recorded thereon for predicting network traffic, wherein the information, when read by the machine, causes the machine to perform the following steps:

determining a discrepancy between predicted future network traffic and an actual level of network traffic, wherein the predicted future network traffic is estimated based on current network operation data using a model previously trained based on historical network operation data;

sending a model adaptation request to adapt the model to the current network operation data when the discrepancy satisfies a predetermined condition;

determining one or more drifting features in network operation data based on the historical network operation data and the current network operation data;

identifying multiple nodes/layers in the model that are impacted by the drifting features;

adapting the model by targeting at the impacted multiple nodes/layers by:

adjusting weights associated with each of the multiple nodes/layers along propagation paths of the drifting features, determining a current loss of the model using the adjusted weights, if the current loss corresponds to a loss decrease as compared with a previous loss of the model without the adjusted weights, updating the model using the adjusted weights, if the current loss corresponds to a loss increase as compared with the previous loss, replacing the previous loss using the current loss, and repeating the steps of adjusting, determining, updating, and replacing before the current loss satisfy a predetermined convergence condition;

predicting the future network traffic using the adapted model based on real time network data; and taking an action to manage the network according to the predicted future network traffic, wherein the action includes at least one of:

adjusting the network traffic directed to different regional area networks (RANs);

allocating resources to the RANs;

detecting network intrusions that cause the predicted network traffic.

8. The medium of claim 7, wherein the determining one or more drifting features comprises:

with respect to each feature in an input vector to the model, determining a first distribution of the feature based on the historical network operation data, determining a second distribution of the feature based on the current network operation data, selecting the feature as a drifting feature if the second distribution differs from the first distribution.

9. The medium of claim 8, wherein the information, when read by the machine, further causes the machine to perform the following steps:

computing a first set of statistics characterizing the first distribution;

computing a second set of statistics characterizing the second distribution;

determining whether the second distribution differs from the first distribution based on the first and the second set of statistics.

10. The medium of claim 7, wherein the identifying multiple nodes/layers comprises:

identifying impacted nodes in an input layer of the model that take a drifting feature as input;

for each of the impacted nodes in the input layer, identifying a propagation path from the impacted node to nodes at other layers in the model, identifying propagated nodes in the propagation path in the other layers;

determining the impacted layers each of which includes at least one impacted or propagated nodes; and outputting the impacted nodes in the input layer, the propagated nodes in the other layers, and the impacted layers as the multiple nodes/layers.

11. The medium of claim 7, wherein the information, when read by the machine, further causes the machine to perform updating, in each iteration, an impact similarity matrix recording impact similarities between the multiple nodes/layers by:

receiving impact losses computed for the multiple nodes/layers due to the adjusted weights;

computing the impact similarities between different ones of the multiple nodes/layers based on the received impact losses;

recording the impact similarities in the impact similarity matrix.

12. The medium of claim 11, wherein the information, when read by the machine, further causes the machine to perform updating the multiple nodes/layers based on the impact similarities between different ones of the multiple nodes/layers.

13. A system for predicting network traffic, comprising:

a service operation management unit implemented by a processor and configured for determining a discrepancy between predicted future network traffic and an actual level of network traffic, wherein the predicted future network traffic is estimated based on current network operation data using a model previously trained based on historical network operation data, and sending a model adaptation request to adapt the model to the current network operation data when the discrepancy satisfies a predetermined condition;

a hyper targeted model adaptation unit implemented by a processor and configured for:

determining one or more drifting features in network operation data based on the historical network operation data and the current network operation data, identifying multiple nodes/layers in the model that are impacted by the drifting features, adapting the model by targeting at the impacted multiple nodes/layers by:

adjusting weights associated with each of the multiple nodes/layers along propagation paths of the drifting features, determining a current loss of the model using the adjusted weights, if the current loss corresponds to a loss decrease as compared with a previous loss of the model without the adjusted weights, updating the model using the adjusted weights, if the current loss corresponds to a loss increase as compared with the previous loss, replacing the previous loss using the current loss, and repeating the steps of adjusting, determining, updating, and replacing before the current loss satisfy a predetermined convergence condition;

a model-based metric prediction unit implemented by a processor and configured for predicting the future network traffic using the adapted model based on real time network data; and the service operation management unit is further configured for taking an action to manage the network according to the predicted future network traffic, wherein the action includes at least one of:

adjusting the network traffic directed to different regional area networks (RANs);

allocating resources to the RANs;

detecting network intrusions that cause the predicted network traffic.

14. The system of claim 13, wherein the determining one or more drifting features comprises:

with respect to each feature in an input vector to the model, determining a first distribution of the feature based on the historical network operation data, determining a second distribution of the feature based on the current network operation data, selecting the feature as a drifting feature if the second distribution differs from the first distribution, computing a first set of statistics characterizing the first distribution, computing a second set of statistics characterizing the second distribution, and determining whether the second distribution differs from the first distribution based on the first and the second set of statistics.

15. The system of claim 13, wherein the identifying multiple nodes/layers comprises:

identifying impacted nodes in an input layer of the model that take a drifting feature as input;

for each of the impacted nodes in the input layer, identifying a propagation path from the impacted node to nodes at other layers in the model, identifying propagated nodes in the propagation path in the other layers;

determining the impacted layers each of which includes at least one impacted or propagated nodes; and outputting the impacted nodes in the input layer, the propagated nodes in the other layers, and the impacted layers as the multiple nodes/layers.

16. The system of claim 13, further comprising updating, in each iteration, an impact similarity matrix recording impact similarities between the multiple nodes/layers by:

receiving impact losses computed for the multiple nodes/layers due to the adjusted weights;

computing the impact similarities between different ones of the multiple nodes/layers based on the received impact losses;

recording the impact similarities in the impact similarity matrix.

17. The system of claim 16, further comprising updating the multiple nodes/layers based on the impact similarities between different ones of the multiple nodes/layers.

* * * * *